United States Patent

Senolt et al.

[15] 3,652,445
[45] Mar. 28, 1972

[54] BITUMEN BLASTING PROCESS AND APPARATUS THEREFOR

[72] Inventors: Hans Senolt; Heinrich Tomaschko; Georg Palvik, all of Vienna, Austria

[73] Assignee: Osterreichische Mineralolverwaltung Aktiengesellschaft, Vienna, Austria

[22] Filed: July 23, 1969

[21] Appl. No.: 843,955

[30] Foreign Application Priority Data

July 25, 1968  Austria .................................. A 7211/68

[52] U.S. Cl. ............................................................208/6
[51] Int. Cl. ...........................................................C10g 1/00
[58] Field of Search.....................................................208/6

[56] References Cited

UNITED STATES PATENTS

| | | | |
|---|---|---|---|
| 1,901,172 | 3/1933 | Kirk | 208/6 |
| 1,306,520 | 6/1919 | Burkley | 208/6 |
| 1,259,674 | 3/1918 | Roseu | 208/6 |
| 2,170,496 | 8/1939 | Gard | 208/6 |

Primary Examiner—Delbert E. Gantz
Assistant Examiner—Veronica O'Keefe
Attorney—Holman & Stern

[57] ABSTRACT

Soft asphalt is hardened by passing a stream of air into and through the asphalt in a molten state. The air stream forms air bubbles which rise through the asphalt. The air bubbles are forcibly coalesced into air sacs and the air sacs are redispersed into air bubbles. The air bubbles may be coalesced into air sacs and redispersed more than once.

2 Claims, 1 Drawing Figure

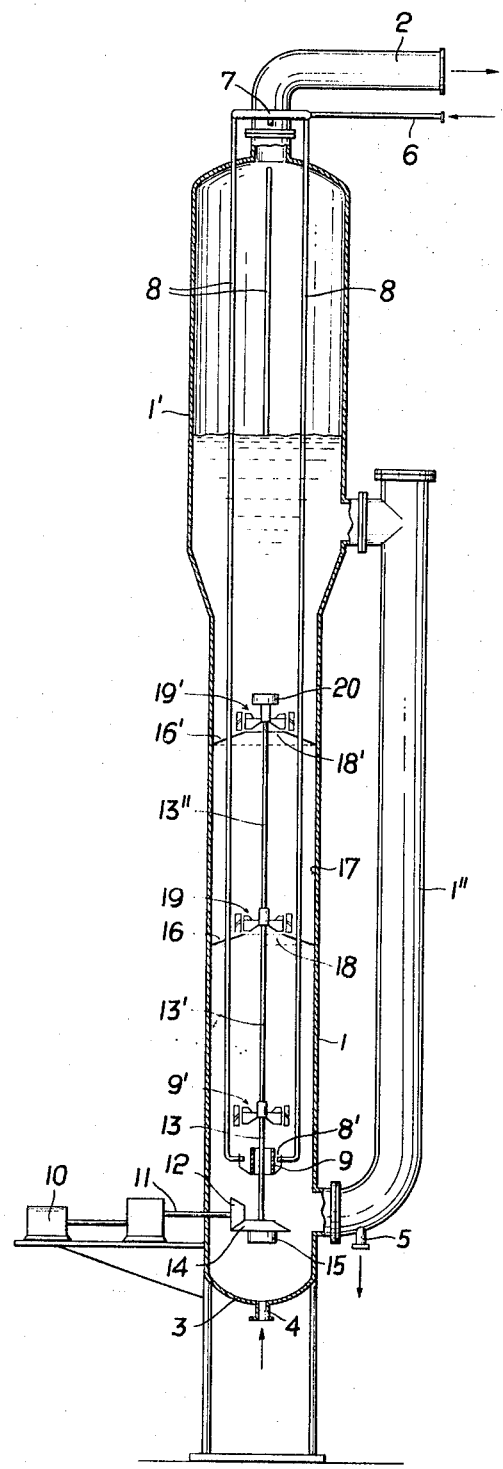
INVENTORS
HANS SENOLT
HEINRICH TOMASCHKO
GEORG PALVIK

BITUMEN BLASTING PROCESS AND APPARATUS THEREFOR

The invention relates to an asphalt blowing process. Asphalt is a very viscous liquid, consisting essentially of hydrocarbons and is soluble in carbon disulphide. It is substantially nonvolatile and softens gradually when heated. It is black or brown in color and possesses waterproofing and adhesive properties. It is obtained principally by refinery processes from petroleum oil, and is also found as a natural deposit or, in association with mineral matter as a component of naturally occurring asphalt.

Asphalt is a natural or artificial mixture of bitumen with a substantial portion of solid mineral matter.

The known asphalt blowing process is used to produce mineral oil asphalts of a desired consistency, i.e. of a particular hardness, from mineral oil distillation residues or so-called soft asphalt. The soft asphalt is heated to a temperature of 250° C. and thus made highly liquid in a blowing vessel (a vertical cylindrical vessel) and is brought into intimate contact with fresh air blown into the asphalt in the base of the blowing vessel and the air is finely dispersed. As the air bubbles rise in the blowing vessel contents part of the oxygen contained in each bubble penetrates into the surrounding soft asphalt and there forms oxygen addition products in the form of peroxides and/or hydroperoxides. The air bubbles burst on reaching the surface of the reaction material and the gas contained, that is the waste air impoverished of oxygen, flows through the blowing vessel head to a waste air line. The oxygen addition products formed by contact of the soft asphalt with the air bubbles are dispersed in the asphalt and there react again to form products of the desired consistency. This process is carried out until the asphalt has reached the desired degree of consistency.

The economics of the blowing process depend essentially on two factors, namely the time required to produce a given end product from a given initial product, that is consistency increase per unit time, and on the consumption of finely dispersed fresh air, that is the number of cubic of air required per ton and consistency increase. The former factor determines the amount of investment in plant and the operational time cost per ton of finished product, and the second factor the cost of investment in the operation medium, that is the blowing air, together with the required energy consumption. All efforts to improve the economic efficiency of the blowing process therefore have to be directed towards shortening the blowing times as much as possible and consuming the blowing air as extensively as possible.

As has already been indicated, the blowing process proceeds essentially in two stages. In the first stage the oxygen contained in the bubbles diffuses into the soft asphalt surrounding the bubbles, that is it is brought to a reactant contained in the soft asphalt. In the second stage the chemical reaction between the introduced oxygen and the reactant takes place. It has been shown that the first stage, that is the diffusion of the oxygen, as the slower stage of the asphalt blowing process is the one which determines the time taken for the process. It is expressed by the Fick equation $$W = k \cdot A \cdot P \cdot t / s$$

where $W$ is the volume of diffusing gas, $k$ the diffusion rate constant, $A$ the diffusion area, $P$ the driving oxygen partial pressure, $t$ the diffusion time and $s$ the density of the respective film to be penetrated. If $W$ is to be increased, then the factors $k$, $A$, $P$, $t$ must be increased or $s$ decreased.

The diffusion rate constant $k$ as a material constant depends only on the viscosity, that is on the temperature of the asphalt. Since this for the sake of the reaction must not exceed a certain value (about 250° C.), increasing the diffusion by raising this constant cannot be envisaged. The latter, by contrast, becomes smaller and smaller during the process since the aim of the blowing process is in fact to achieve a specific increase in the consistency of the asphalt.

The diffusion area $A$ can be increased in two ways, namely by increasing the number of air bubbles injected into the blowing vessel rising through its contents, and by decreasing the size of the bubbles. With respect to increasing the number of bubbles, there are relatively narrow limits on this since if there is a small mutual separation between the bubbles the bubbles will join together to form larger bubbles. To prevent the formation of larger bubbles and the associated decrease in the diffusion area, at the points in the blowing vessel at which coalescence of the bubbles is to be expected means are provided to counteract coalescence of the bubbles or to reverse previous coalescence by redispersal. The number of bubbles and therefor the dimensions of the diffusion area remain limited in every case. On the other hand, with respect to reducing the size of the air bubbles, 1,000 air bubbles for example with a radius of 0.5 mm. contain the same amount of air as one bubble with a radius of 5 mm., but have 100 times the surface area. But the energy required to create bubbles with 1 mm. diameter is 9 times that for bubbles with a diameter of 10 mm.

It also proves problematic to increase the diffusion by increasing the oxygen partial pressure $P$. Blowing under increased pressure does raise the oxygen partial pressure in the air bubbles, but also increases by the same amount the oxygen partial pressure in the exhaust system and hence the danger of secondary reactions and explosions in the waste air. The same is true for increasing the partial pressure by adding oxygen ($O_2$) or ozone ($O_3$) and chlorine ($Cl_2$) or nitrogen dioxide ($NO_2$) or to the blast air, chlorine and nitrogen dioxide also having the disadvantage that they produce technically unsuitable by-products, in the waste air. It also has to be remembered that an air bubble is a completely closed system, due to which the initial partial pressure in the bubble drops very rapidly as the oxygen on the one hand is consumed by the asphalt, on the other hand is diluted by back diffusion of reaction products such as water and carbon dioxide ($CO_2$), in addition to which the bubbles are subject to a constantly decreasing static liquid pressure as they rise in the asphalt.

With respect to the diffusion time $t$, it is a known practice to increase this by increasing the height of the reactor, but this means added costs of construction.

The principle aim of the invention is to increase the economic efficiency of the blowing process. The invention arises from considerations relating to the last parameter appearing in Fick's formula, that is the respective film thickness to be penetrated. To increase the diffusion, this has to be kept as small as possible. At the instant when the bubbles are formed, air and fresh asphalt are in direct contact in every case. But when the reacting components in the boundary surfaces have been consumed, the oxygen has to penetrate deeper into the asphalt film to meet its reactant. The resistance to diffusion thus increases, the driving oxygen partial pressure at the same time being reduced for the reasons already given (oxygen absorption by the asphalt, additional decrease in oxygen content due to back diffusion of reaction products, reduction in the static liquid pressure as the bubbles rise). As a result the diffusion process rapidly comes to a halt. Investigations into this have shown that the oxygen diffusion into the asphalt which essentially determines the economic efficiency of the blasting process and the quality of the end product, in fact ceases when the air bubbles have only travelled a fraction of their path from the point at which they are produced, that is the device by which fresh air is injected into the lower part of the blowing vessel, up to the surface of the asphalt, and when only about a third of the oxygen in the bubbles has been consumed.

Accordingly the invention provides an asphalt blowing process comprising passing an air stream through molten asphalt, wherein air bubbles are formed in the asphalt, the air bubbles are forcibly coalesced, and the resultant air sacs are redispersed, thereby creating new air/asphalt phase boundary surfaces. Whereas up to no coalescence of the individual bubbles was prevented by all possible means, according to the present invention exactly the opposite is brought about, namely extensive combination of the bubbles to form large air sacs. This gives rise to extensive breaking up of the liquid phase boundary surfaces of the gases forming the bubbles, which have already taken part in the reaction and prevent further oxygen diffusion, since the surface area of the air sacs formed by forced coalescence of bubbles will always be smaller than the sum of the surface areas of the bubbles. At the same time the gaseous phases formed by the bubbles are forcibly stripped from the surrounding films which have already reacted, and escape into the reaction material. If the forcibly formed air sacs are then redispersed into bubbles, these will be surrounded by as yet unconsumed, therefore again reactive, liquid boundary surfaces so that diffusion of the oxygen into the asphalt begins again at a higher rate. As will be seen from the examples given below, in this way the asphalt blowing process is considerably accelerated accompanied by a significant saving in the blowing air.

The forced coalescence and redispersion of the air can be repeated a number of times, advantageously as often as oxygen is still found to be present in the bubbles.

The invention also provides an asphalt reactor for carrying out a method according to the invention comprising a blowing vessel provided with first means to coalesce the bubbles rising in the blowing vessel contents, above each of these being second means for redispersing the air sacs so formed The first means are deflector plates, baffle plates, sieves or the like preferably of funnel-like form which lead to the second means for redispersing the air sacs. Advantageously the funnel-like deflector plates or other first means extend inwards from the inside wall of the blowing vessel with the second means for redispersing the air sacs arranged above.

The invention is described in more detail with respect to the drawing which shows a longitudinal section of an asphalt blowing vessel according to the invention. The waste air line 2 extends from the upper part of a blowing vessel 1. In the reactor base 3 there is an input aperture 4 through which a material to be treated that is soft mineral oil distillation residues to be converted into mineral oil asphalt of a desired hardness, can be pumped into the vessel. Branching off from the upper part 1' of the vessel there is also a circulation tube 1'' which discharges into the vessel near its base 3. The tube 1'' is provided with a discharge opening 5 through which the finished blowing material can be removed. A blowing air line 6 communicates with an air distributor ring or manifold 7 arranged above the blowing vessel. Going out from this there are four parallel tubes 8 forming the blowing air line, only three of these being shown in the drawing, with one of the same being partially broken away for ease of illustration. The tubes 8 pass through the upper blowing vessel wall and lead through the vessel to the gas distributor 9, 9' mounted in the region of the base 3 of the vessel. The gas distributor 9, 9' consists of a cylindrical part 9 and a dispersing turbine 9'. Mouths 8' of the tubes 8 are diverted towards the peripheral surfaces of the part 9. The dispersing turbine 9' is driven by a motor 10, drive shaft 11 of which carries a bevel gear 12 which meshes with a bevel gear 14 carried by turbine shaft 13. 15 is the lower position of the turbine shaft 13. The blowing vessel is filled with the asphalt to be treated up to a level above the point at which the circulating tube 1'' branches off.

Above the gas distributor 9, 9' in the blowing vessel there is a device 16 for coalescing the bubbles rising through the asphalt. This device is in the form of a funnel-like deflector plate which extends inwards from the wall 17 of the vessel. Instead of the funnel-like deflector plate, other means can be used to coalesce the air bubbles into large air sacs, for example baffle plates or sieves. Above the opening 18 of the bubble coalescing device formed by the deflector plate there is a device 19 for redispersing the air sacs which have been formed. The device 19 consists of a redispersing turbine of the same type as the dispersing turbine 9' of the gas distributor 9, 9'. The redispersing device 19 is arranged directly above the bubble fusing device 16. The shaft of the redispersing turbine 9' is an extension 13' of the shaft 13 of the dispersing turbine 9'. Above the redispersing turbine 19 is a further bubble coalescing device 16' consisting in the same way as the bubble coalescing device 16 of a funnel-like deflector plate extending inward from the wall 17 of the reactor, the opening 18' in which leads to a further redispersing turbine 19' arranged immediately above which is exactly similar to the redispersing turbine 19. This second redispersing turbine 19' is driven by another extension 13'' of the shaft 13. 20 denotes the upper position of the shafts 13, 13', 13''.

During the blowing process fresh air is fed to the blowing vessel contents, that is into the soft asphalt to be converted into mineral oil asphalt of the desired hardness, through the blowing air feed line 6, the air distributor ring or manifold 7 and the tubes 8; the air is dispersed in fine bubbles by the driven gas distributor 9, 9' and these then rise through the asphalt. On meeting the deflector plate 16 the bubbles are coalesced into relatively large air sacs which slide obliquely upwards along the funnel-like deflector plate and roll through the aperture 18 in the deflector plate to the redispersing device 19 by which they are again dispersed into fine bubbles. As has already been stated, when the bubbles are forcibly coalesced into air sacs the liquid and gaseous phases are extensively separated. The gases forming the bubbles lose contact with the previously surrounding liquid films, which have already taken part in the reaction and therefore oppose further oxygen diffusion, as these liquid films are so to speak, stripped off them to be distributed in the asphalt and to go down in this. The redispersion of the air sacs by the redispersing turbine 19 forms new boundary surfaces between the air and the asphalt at which effective oxygen diffusion into the liquid phase can take place so that the material is again treated at full intensity. As they rise the newly formed bubbles again become surrounded by films gradually inhibiting oxygen diffusion which are once again separated from the gaseous phase by the coalescing device 16', the air sacs thus formed being dispersed into bubbles by the redispersing turbine 19' above so that new phase boundary surfaces ready to react are again created. The asphalt in the vessel is continuously circulated using the so-called air-lift pumping effect through the circulating tube 1''. The waste air collecting above the surface of the material is discharged through the pipe 2.

In the following are given the results of comparative tests, the first pair of tests relating to continuous and the second pair of tests to discontinuous operation.

a. In a blowing vessel equipped in accordance with the latest prior art and having a fresh air distributor and a redisperser turbine, soft asphalt B 200 (softening point as determined by the ring and ball method 39° C.; penetration at 25° C., 200 1/10 mm.) was continuously blown to a medium asphalt B 85 (softening point as determined by the ring and ball method 47° C., penetration at 25° C.: 85 1/10 mm.) at 230° C.

Per ton useful content and blowing day the reactor output was 9.524 kg. B 85 for an air consumption of 86.4 Nm.3 air per ton of converted product.

b. In a blowing vessel as shown in the drawing having a fresh air distributor and two coalescing and two redispersing devices, the same input as in example (a) was continuously blown to the same end product at 230° C.

Per ton useful content and blowing day the reactor output was 15.625 kg. B 85 for an air consumption of 42.24 Nm.$^3$ per ton of converted product.

c. In a known blowing vessel of the type in example (a) asphalt B 200 of the same nature as in example (a) was discontinuously blown to a hard asphalt B 10 (softening point as determined by the ring and ball method: 85° C., penetration at 25° C.: 8 1/10 mm.) at 230° C.

Per ton useful content and blowing hour the reactor output was 100 kg. B 10 for an air consumption of 342.86 Nm.$^3$ per ton of converted product.

d. In a blowing vessel according to the invention as in example (b) the same process was carried out as described in (c).

Per ton useful content and blowing hour the reactor output was 250 kg. B 10 for an air consumption of only 110.0 Nm.$^3$ per ton of converted product.

From these comparative tests it can be seen that the asphalt blowing process according to the invention not only considerably accelerates the process, but also provides a saving of 50–67 percent on the operating medium of blowing air.

We claim:
1. An asphalt blowing process comprising the steps of:
   a. introducing molten asphalt into an elongate vertical blowing vessel;
   b. passing an air stream into and through said asphalt below the surface thereof, whereby air bubbles are formed in said asphalt and rise therein;
   c. deflecting said air bubbles to thereby forcibly coalesce the same into air sacs; and
   d. mechanically agitating said asphalt to thereby forcibly redisperse said air sacs as air bubbles, whereby fresh air/asphalt phase boundary surfaces are created.

2. A process according to claim 1, wherein said steps of deflecting said air bubbles to thereby forcibly coalesce the same into air sacs and mechanically agitating said asphalt to thereby forcibly redisperse said air sacs as air bubbles are repeated.

* * * * *